March 30, 1926.
C. REINKER
1,578,367
HIGH VOLTAGE SIGNALING SYSTEM FOR ELECTRICALLY OPERATED STREET CARS
Filed May 16, 1921
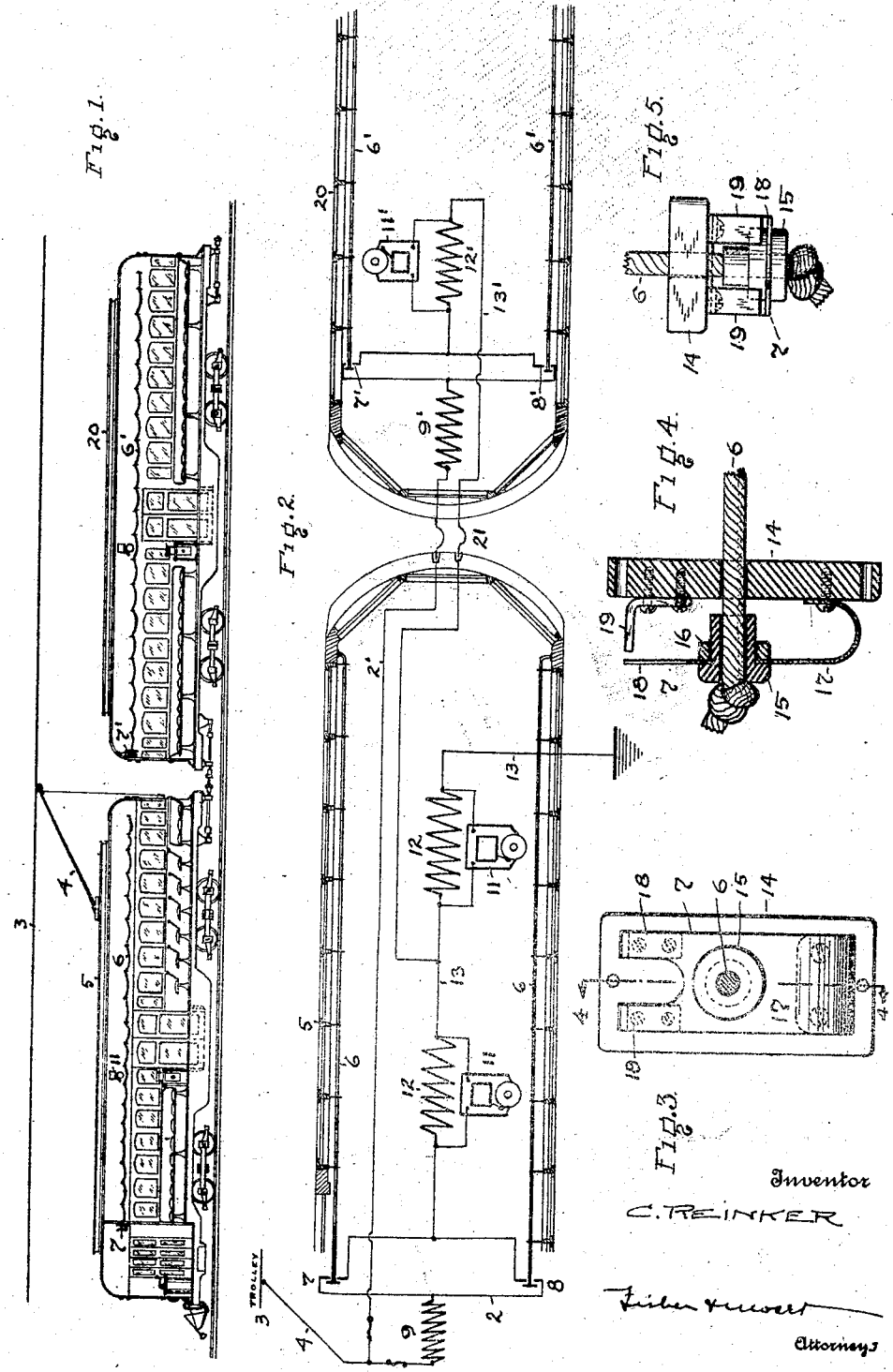

Patented Mar. 30, 1926.

1,578,367

UNITED STATES PATENT OFFICE.

CHRISTIAN REINKER, OF LAKEWOOD, OHIO.

HIGH-VOLTAGE SIGNALING SYSTEM FOR ELECTRICALLY-OPERATED STREET CARS.

Application filed May 16, 1921. Serial No. 469,913.

To all whom it may concern:

Be it known that I, CHRISTIAN REINKER, a citizen of the United States, residing at Lakewood, in the county of Cuyahoga and State of Ohio, have invented certain new and useful Improvements in a High-Voltage Signaling System for Electrically-Operated Street Cars, of which the following is a specification.

The present invention provides a simple and efficient electrical signaling system for electrically operated street cars whereby a trolley current of high voltage may be safely employed to operate one or more electric bells or other signaling devices in the trolley car and its trailers, and whereby the number of electric switches necessary to permit signaling by all the passengers may be reduced to a minimum through and by the aid of cords stretched longitudinally at each side of the car above or near the windows within convenient reach of the passengers occupying the seats and aisle. These cords are not only placed where they are accessible and easy to operate but they serve also to insulate and protect the users from electric shock.

It is a common practice to operate electric signals in a street car with the use of dry batteries of low voltage, or with a trolley current circuit in which interrupters are employed in series with buzzers. In each of the old systems a large number of electric switches of the push button type must be used, one at each window post or seat, and in some cars at least twenty-five push-buttons are installed, thus requiring a large amount of wiring to be done in the cars. Trouble arises often on account of the use of so many push-buttons and whenever a push-button becomes short circuited, it is difficult to locate the seat of the trouble and sometimes all of the push-buttons must be disconnected before the cause of the trouble is found. The same difficulties arise when the wires become crossed or broken, and such systems also expose the passengers to shocks and injury in operating the push-buttons because the current is conveyed directly to and through each push-button. In my invention only a few electric switches are required and these are located at a remote point from the passengers; the wiring is reduced to a minimum; no wiring and fitting of switches is required or used at each seat; the danger of short-circuiting and electric shocks is largely avoided, and the initial cost and ultimate upkeep is greatly reduced as compared with former practices.

In the accompanying drawing, Fig. 1 is a reduced view of a trolley car and trailer in which separate signal cords are arranged to operate switches and bells according to my invention, and Fig. 2 is a diagrammatic view showing the electric circuit and devices involved. Fig. 3 is a front view of the pull switch, and Fig. 4 a vertical section thereof on line 4—4 of Fig. 3. Fig. 5 is a plan view of said switch.

The more common types of electric street cars embody seats at opposite sides of a central aisle, and the motorman occupies a cab or enclosed station in front while the conductor is stationed either at a rear or side door. When a trailer is coupled to a trolley car a second conductor is stationed therein to receive and give starting and stopping signals for the passengers on the trailer to the conductor of the trolley car. The passengers in each car signal to the conductor in the car in which they are riding and the starting and stopping signals are given by the conductors to each other and the motorman usually by an independent or private signaling line or device. The present system is designed more particularly for the convenience and use of the passengers and comprises an electric circuit 2 which includes trolley wire 3 and the trolley 4 on a car 5 in which two pull cords 6—6 are suspended on opposite sides lengthwise of the car, preferably above the windows where the passengers may conveniently grasp and pull the cord. Two separate pull-switches 7 and 8 are connected in parallel in circuit 2 and a coil 9 affording a main resistance of approximately 2500 ohms is connected in circuit 2 between these pull-switches and the trolley. Both switches are grounded through an electric bell 11 and a resistance coil 12 connected in parallel or multiple in circuit 2, and two sets of such signaling bells and resistances may be connected in series in the same ground connection to effect simultaneous signaling at remote points on the car. A resistance of approximately 200 ohms may be employed in parallel with each bell 11 where the current is of 550 voltage at the trolley and a main resistance of approximately 2500 ohms is employed to reduce the current for safe operation at the pull switches. The end of the cord which connects with each switch extends through an opening in the insulated base 14 of the switch and thence through an insulating thimble 15 which is tightly fastened by a lock nut 16 to the bow spring contact member 17 of the switch. The free end of this bow spring member is forked to provide two spring extensions 18—18 opposite two fixed contacts 19—19, and when the cord is pulled the bow spring is flexed until the fixed contacts 19 are engaged by the extensions 18 before the inner end of the insulating thimble strikes the base plate and arrests and relieves the pull and strain on the bow-spring. A pull on either cord at any point in the length of the car will close circuit 2 and ring the bells, and both cords may be operated by different passengers at the same time without affecting the system or result.

The system is also conveniently adaptable to trolleys and trailers or a train of cars, and in Figs. 1 and 2 I show a trailer 20 coupled to trolley car 5, the trailer being equipped with a pair of pull-cords 6' and 6' and separate pull-switches 7' and 8' which are connected in parallel with a separate conductor 2' leading to trolley 4 and having a main resistance 9' to protect the switches. A bell 11' and an auxiliary resistance 12' are connected in parallel in the common ground connection 13' for both switches and this ground connection extends through a jumper 21 between the two cars and connects with the ground wire 13 of circuit 2 between the two bells on the trolley car so that when a cord on the trailer is pulled and bell 11' energized a similar signal will be given by a bell in the trolley car.

What I claim is:

In a high voltage signaling system for electrically operated trolley and trailer cars connected therewith, composed of open trolley circuits in said cars, each circuit including a plurality of resistances in series, one of which has in parallel therewith a signal, a second resistance having parallel therewith a second signal, the last said resistance and signal being positioned within the trolley car and included in both circuits, manually actuated means carried within each car for completing each of said circuits, and the last said signal adapted to function upon the completion of either of said circuits.

CHRISTIAN REINKER.